UNITED STATES PATENT OFFICE.

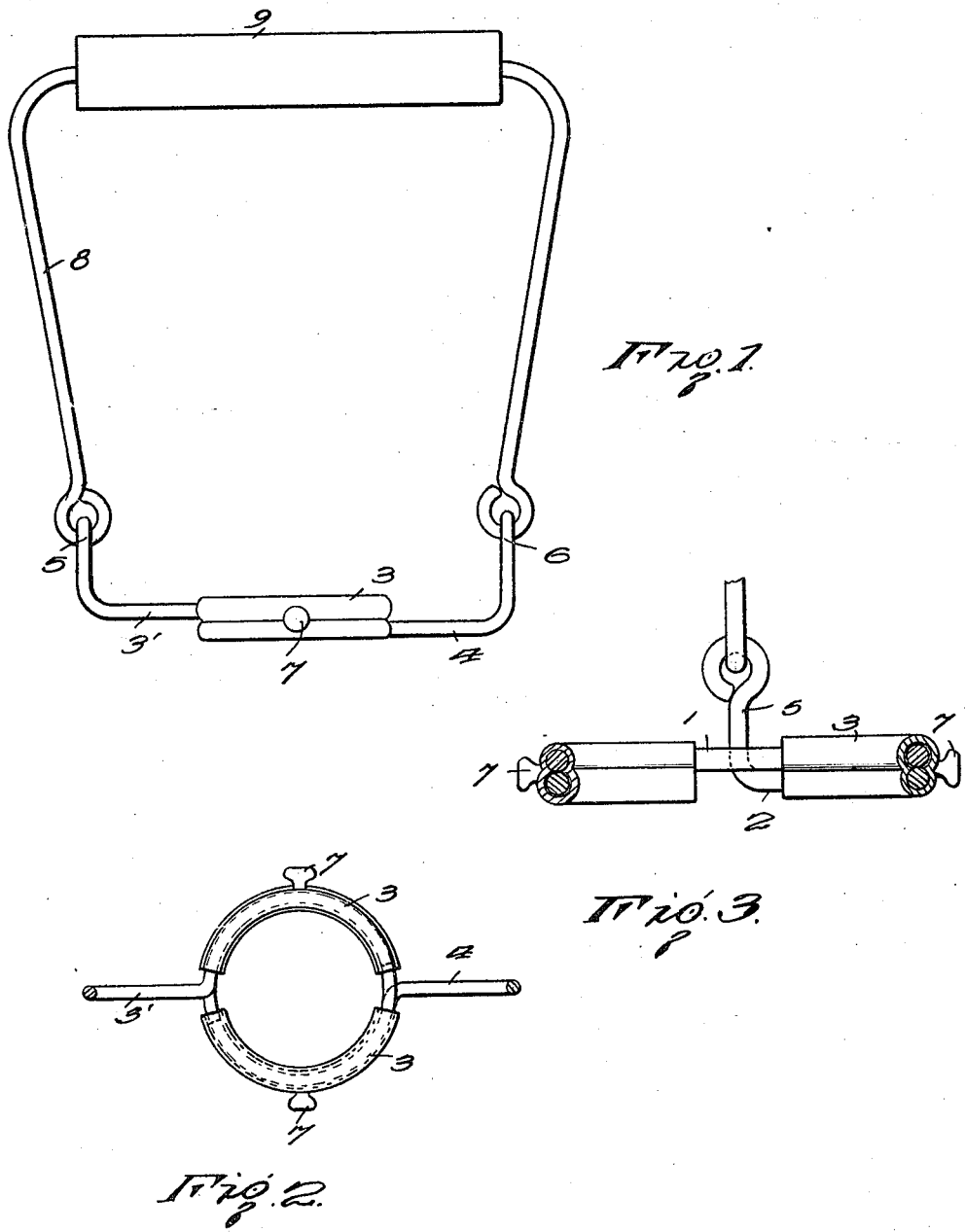

OSBORNE FITZSIMMONS, OF MINNEAPOLIS, MINNESOTA.

ATTACHMENT FOR SUPPORTING AND CARRYING BOTTLES.

1,324,015. Specification of Letters Patent. Patented Dec. 2, 1919.

Application filed March 7, 1918. Serial No. 221,010.

*To all whom it may concern:*

Be it known that I, OSBORNE FITZSIMMONS, a citizen of the United States, residing at Minneapolis, in the county of Hennepin and State of Minnesota, have invented certain new and useful Improvements in Attachments for Supporting and Carrying Bottles, of which the following is a specification.

This invention relates to an attachment for carrying and supporting bottles in which a member engages the neck of the bottle and is provided with a handle by which the same may be carried, the member being readily attachable and detachable and the entire device being so constructed that the mechanism firmly grips the bottle when placed thereon. The objects of this invention are to provide a mechanism of this kind which will be simple to manufacture and efficient in operation for the purposes intended, and moreover it is my intention to provide an attachment which may be made with as few elements as possible and at the same time be strong and positive in its action when attached and supporting a bottle. Further objects of this invention relate to the particular arrangement and association of combined means disclosed herein together with the particular configuration and shape of the various elements and the material of which the same are composed so that the device in its entirety may be cheaply manufactured and at the same time productive of the highest results.

In the drawings:

Figure 1 is a side elevation of the device,

Fig. 2 is a top plan view of the bottle gripping means, and

Fig. 3 is a vertical section through the same.

Referring to the drawings, it will be seen that my invention includes a ring shaped element adapted to tightly grip the neck of the bottle provided with upwardly extending eyes to which a suitable bail or handle may be pivoted. The manner in which the bottle neck gripping member is made constitutes one of the primary features of my invention and one embodiment of the same will now be described. Two substantially similar ring shaped members 1 and 2 located within a peculiarly shaped casing or tubular holder 3 hereinbelow more specifically set forth are made in the shape of open or split rings with their ends terminating a short distance apart while the end portions of these ring members opposite the free ends are off-set laterally at 3' and 4 as clearly shown in the drawings. The off-set 3' on the ring 1 and the off-set 4 on the ring 2 are bent upwardly to provide curved hooks or eyes 5 and 6 adapted to form a pivot for receiving and supporting the looped terminals of the bail or handle of the attachment. The open rings 1 and 2 overlap and lie one above the other for substantially their entire circumferential distance as will be clearly evident from an inspection of the drawings. The members 1 and 2 are held in operative relation each with the other by means of a pair of substantially semi-circular retaining casings 3. These casings are of the transverse configuration shown in the cross sectional view on the drawings. The shape of the casing is made such as to tightly grip one of the members 1 or 2 and permit the other of the members 1 or 2 to freely slide therein, for example, as shown on the left hand side of Fig. 3 the casing 3 tightly fits around the uppermost open ring shaped member for substantially one-half of its entire circumference while the lower open ring member 2 slides freely in this particular casing 3. From a consideration of the right hand side of Fig. 3 it will be seen that the casing 3 tightly grips the lower member 2 and permits the upper member 1 to freely slide therein which is substantially the opposite arrangement by which the other casing 3 is positioned relative to the members 1 and 2. This means that the member 1 is fixed to one of the casings 3 and slides freely in the other, while the member 2 is fixed to the other casing 3 and freely slides in the first mentioned casing. The rings 1 and 2, being split and formed of a more or less resilient material will naturally tend to close tightly around the neck of the bottle. At the same time, a certain amount of lateral or opening movement of the rings is permitted by the construction described and for this purpose each casing 3 is provided at the central portion of the same with a handle or knob 7 by which the attachment may be grasped and the rings pulled apart so as to remove or attach the device to a bottle. The bail 8 which is connected to each of the eyes 5 and 6 is made in the configuration illustrated in the drawings and being provided with a certain amount of spring action which tends to force the lower free ends of the bail toward each other and consequently further facilitates the tendency of the members 1 and 2 to tightly grip the neck of the bottle. The bail 8 may be provided with a suitable handle 9 loosely mounted thereon as will be readily understood.

The operation of my invention and the manner by which the same may be applied and detached to a bottle will, it is believed, be readily understood from the foregoing description. The pair of casings 3 permit the members 1 and 2 to be pulled apart to widen the circle made by the same but at the same time the casings 3 retain the members 1 and 2 in proper operative positions. It is to be understood that the space between the free ends of each of the members 1 and 2 and the lateral off-set parts 3' and 4 may be made any amount desired but it is preferable to have the same terminate near the off-sets 3' and 4 so as to get a tight gripping and positive action of the attachment. The members 1 and 2 may be preferably made of circular wire but it is understood that the same may assume various cross sectional shapes without departing from the spirit of my invention, and furthermore, while I have shown the casings 3 as in the form of a double tube arrangement, it is evident that various other shapes would be made to conform with the particular shape of the cross section of the members 1 and 2 used, it being apparent that these members could be square or any other shape in cross section if desired.

Having thus described my invention, what I desire to secure by Letters Patent of the United States and claim is as follows:

1. In a bottle attachment of the class described, the combination of a split ring having an off-set upwardly extending projection continuing from one of the end portions, a coöperating similarly shaped opening having its off-set upwardly extending projection located diametrically opposite the first mentioned projection, a pair of arcuate casings telescopically engaging each of said rings and positioned opposite to each other, one of said casings being attached to one of said rings and the other being attached to the other of said rings, and means engaging the off-set projection of the rings for supporting and carrying the bottles.

2. In a detachable bottle attachment of the character set forth, the combination of a plurality of split open rings, one end portion of each of said rings being formed with a laterally off-set and upwardly extending bail supporting eye, said eyes being arranged in opposed relation to each other, a pair of opposed arcuate casings telescopically engaging each of said ring members when said ring members are arranged in superposed relation, one of the casings being secured to one of the rings, and knobs attached to said casings whereby the rings may be separated to attach and detach the device from the neck of the bottle.

3. In a detachable bottle attachment of the character set forth, the combination of a plurality of superposed split rings, a bail supporting arm continuing from one end of each of said rings, said arms being arranged in opposed relation with respect to each other, a pair of semi-circular casings of such transverse configuration as to inclose opposite portions of both of said superposed rings, one of said casings being attached to one of said rings and the other of said casings being attached with the other of said rings while a portion of each of said rings slides freely in that casing which is attached to the other rings, and knobs attached to the casings whereby the rings may be opened to attach and detach the device to the neck of a bottle.

In testimony whereof I affix my signature hereto.

OSBORNE FITZSIMMONS.